(12) United States Patent
Wang

(10) Patent No.: US 6,909,421 B2
(45) Date of Patent: Jun. 21, 2005

(54) WIRELESS INPUT DEVICE

(75) Inventor: Yung-Hui Wang, Taipei (TW)

(73) Assignee: Paten Wireless Technology Inc., Taipei (TW)

(*) Notice: Subject to any disclaimer, the term of this patent is extended or adjusted under 35 U.S.C. 154(b) by 282 days.

(21) Appl. No.: 10/162,922

(22) Filed: Jun. 6, 2002

(65) Prior Publication Data

US 2003/0179177 A1 Sep. 25, 2003

(30) Foreign Application Priority Data

Mar. 21, 2002 (TW) .................................. 91203462 U

(51) Int. Cl.⁷ ................................................ G09G 5/08
(52) U.S. Cl. ........................ 345/163; 345/158; 345/169
(58) Field of Search ................................ 345/156, 157, 345/158, 168, 169, 163, 164, 165, 166, 167

(56) References Cited

U.S. PATENT DOCUMENTS

| 5,049,863 | A | | 9/1991 | Oka |
| 5,440,502 | A | * | 8/1995 | Register ..................... 361/681 |
| 5,457,480 | A | | 10/1995 | White |
| 5,854,621 | A | | 12/1998 | Junod et al. |
| 5,874,946 | A | | 2/1999 | Nishijima et al. |
| 5,990,870 | A | | 11/1999 | Chen et al. |
| 6,067,076 | A | | 5/2000 | Hocker et al. |
| 6,091,404 | A | * | 7/2000 | Hong et al. ................. 345/167 |
| 6,130,664 | A | | 10/2000 | Suzuki |
| 6,205,021 | B1 | | 3/2001 | Klein et al. |
| 6,219,037 | B1 | * | 4/2001 | Lee ............................. 345/167 |
| 6,225,981 | B1 | | 5/2001 | Lu |
| 6,292,172 | B1 | | 9/2001 | Makhlouf |
| 6,392,635 | B1 | | 5/2002 | Snyder |
| 6,498,458 | B1 | | 12/2002 | Chen |
| 6,541,762 | B2 | | 4/2003 | Kang et al. |
| 6,549,189 | B1 | | 4/2003 | Zarek |
| 2002/0000974 | A1 | | 1/2002 | Murai |
| 2002/0005834 | A1 | | 1/2002 | Oh |
| 2002/0024502 | A1 | | 2/2002 | Iwasaki |
| 2002/0118167 | A1 | | 8/2002 | Mei et al. |
| 2002/0118172 | A1 | | 8/2002 | Jzuhsiang |
| 2002/0126095 | A1 | | 9/2002 | Cheng et al. |
| 2002/0149509 | A1 | | 10/2002 | Kim et al. |
| 2002/0167470 | A1 | | 11/2002 | Chung |
| 2002/0171631 | A1 | | 11/2002 | Yanagi |
| 2002/0190952 | A1 | | 12/2002 | Shah |
| 2003/0103040 | A1 | | 6/2003 | Koike et al. |
| 2003/0160762 | A1 | * | 8/2003 | Lu .............................. 345/163 |

FOREIGN PATENT DOCUMENTS

| JP | 5-100788 | 4/1993 |
| JP | 10-124250 | 5/1998 |
| JP | 3072204 | 10/2000 |
| JP | 3078665 | 4/2001 |
| JP | 3082807 | 1/2002 |

OTHER PUBLICATIONS

"Demand for Trial" based on an invalidation trial for a Japanese registered Utility Model No. 3090068, filed Apr. 9, 2003.

* cited by examiner

Primary Examiner—Xiao Wu
(74) Attorney, Agent, or Firm—Bacon & Thomas, PLLC

(57) ABSTRACT

A wireless input device is constructed to include a transmitter unit, and a receiver unit adapted for installing in a connecting port of a computer system and receiving signal from the transmitter unit to control the pointer on the computer screen of the computer system, the transmitter unit having a receiving open chamber in one side of the housing thereof, and a receptacle provided inside the receiving open chamber and adapted for keeping the receiver unit for enabling the receiver unit to switch off the transmitter unit after removal of the receiver unit from the computer system.

9 Claims, 11 Drawing Sheets

WIRELESS INPUT DEVICE

BACKGROUND OF THE INVENTION

1. Field of the Invention

The present invention relates to a wireless input device for use with a computer system and, more particularly to such a wireless input device, which has receptacle means in the transmitter unit adapted for keeping the receiver unit after removal of the receiver unit from the computer system.

2. Description of the Related Art

Keyboards and mice are commonly used with computers for signal input regular computer mice include mechanical type and optical type mice. A mechanical type computer mouse is equipped with a rolling ball, which is moved on a surface to control the pointer on the computer screen. An optical type computer mouse controls the pointer on the computer screen subject to reflection of light. According to conventional designs, the transmission of a signal from a keyboard or computer mouse to a computer is achieved through a cable. Nowadays, various wireless input devices have been disclosed, and have appeared on the market. These wireless input devices enable the user to control the pointer on the computer screen of a computer system without a cable. A regular wireless input device, as shown in FIG. 8, is generally comprised of a transmitter unit, and a receiver unit adapted for installing in a connection port of a computer to receive a signal from the transmitter unit. The transmitter unit uses a battery to provide the necessary working voltage. This design of wireless input device is still not satisfactory in function. The drawbacks of this design of wireless input device are numerous and outlined hereinafter.

1. When not in use, the user cannot switch off the battery power of the transmitter unit, and much battery power is wasted.
2. When not in use, the user may remove the receiver from the computer, however the user shall have to prepare big storage means to keep the transmitter unit and the receiver unit after removal of the receiver unit from the computer.
3. When carrying the wireless input device, the receiver unit and the transmitter unit tend to be forced against each other, resulting in damage.

SUMMARY OF THE INVENTION

The present invention has been accomplished to provide a wireless input device, which eliminates the aforesaid drawbacks. It is the main object of the present invention to provide a wireless input device, which occupies less storage space when not in use. It is another object of the present invention to provide a wireless input device, which automatically switches off battery power when received. It is still another object of the present invention to provide a wireless input device, which is convenient for carrying by hand when not in use. To achieve these and other objects and according to one aspect of the present invention, the wireless input device comprises a transmitter unit, and a receiver unit adapted for installing in a connecting port of a computer system and receiving signal from the transmitter unit to control the pointer on the computer screen of the computer system. The transmitter unit comprises a receiving open chamber in one side of the housing thereof, and a sliding receptacle provided inside the receiving open chamber and adapted for keeping the receiver unit inside the receiving open chamber when not in use. According to another aspect of the present invention, the sliding receptacle has retaining arms adapted for securing the receiver in position after insertion of the receiver into the inside of the sliding receptacle. According to still another aspect of the present invention, the sliding receptacle has a guide groove adapted for acting against the power switch of the transmitter unit such that the power switch of the transmitter unit is switched off when the receiver unit inserted into the sliding receptacle of the transmitter unit, or switched on when the receiver unit removed from the sliding receptacle of the transmitter unit. According to still another aspect of the present invention, the transmitter unit further comprises an ejector, which automatically pushes the sliding receptacle to a front side position in a rush for enabling the user to remove the receiver unit from the sliding receptacle conveniently when the user pressed the receiver unit against the sliding receptacle.

DETAILED DESCRIPTION OF THE PREFERRED EMBODIMENT

Figure 1:
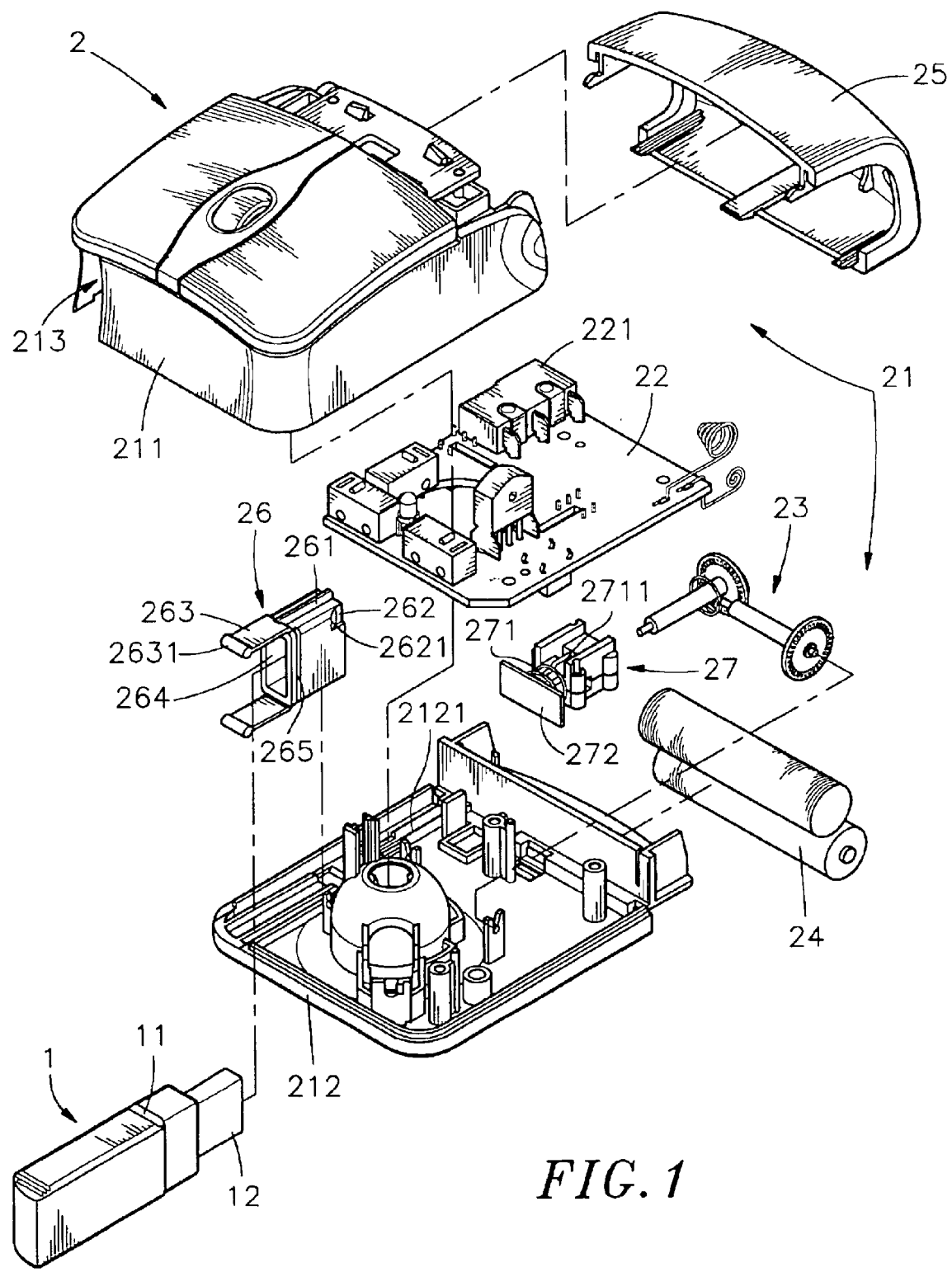
FIG. 1 is an exploded view of a wireless input device according to the present invention.
Figure 2:
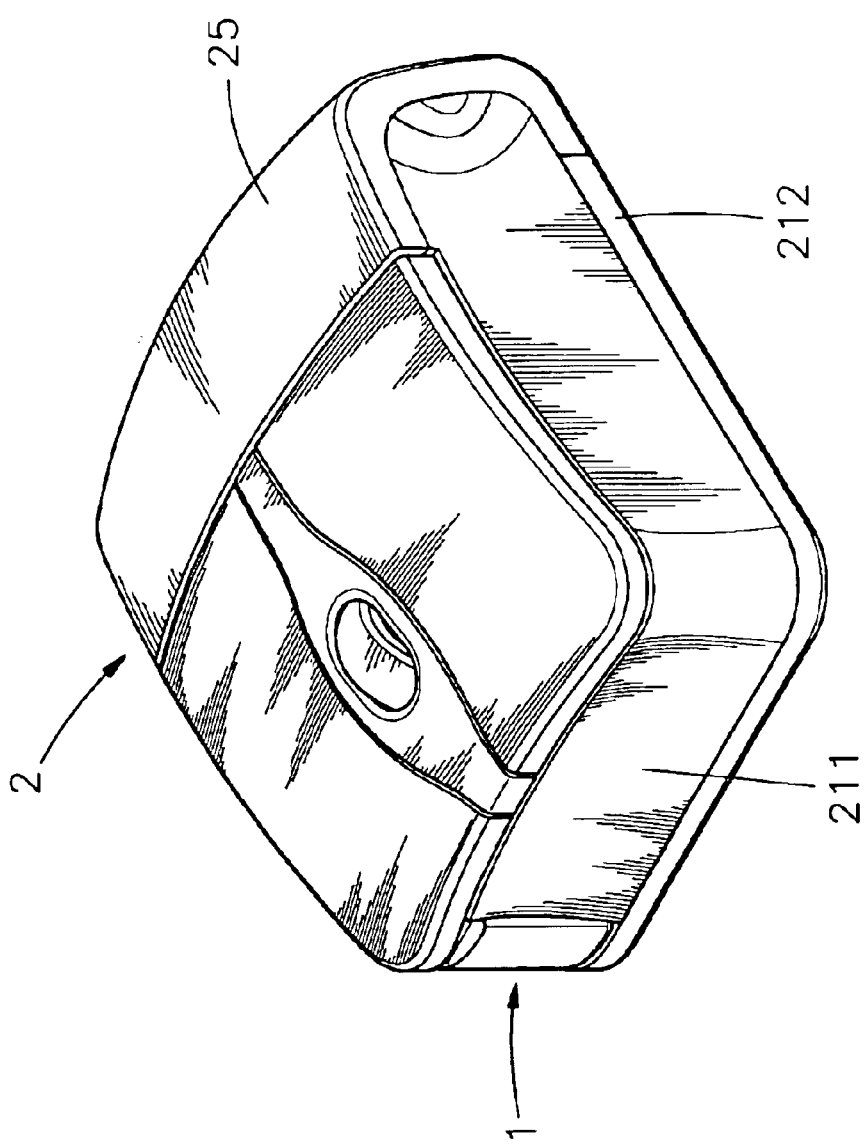
FIG. 2 is an elevational assembly view of the present invention, showing the receiver unit received inside the transmitter unit.
Figure 3:
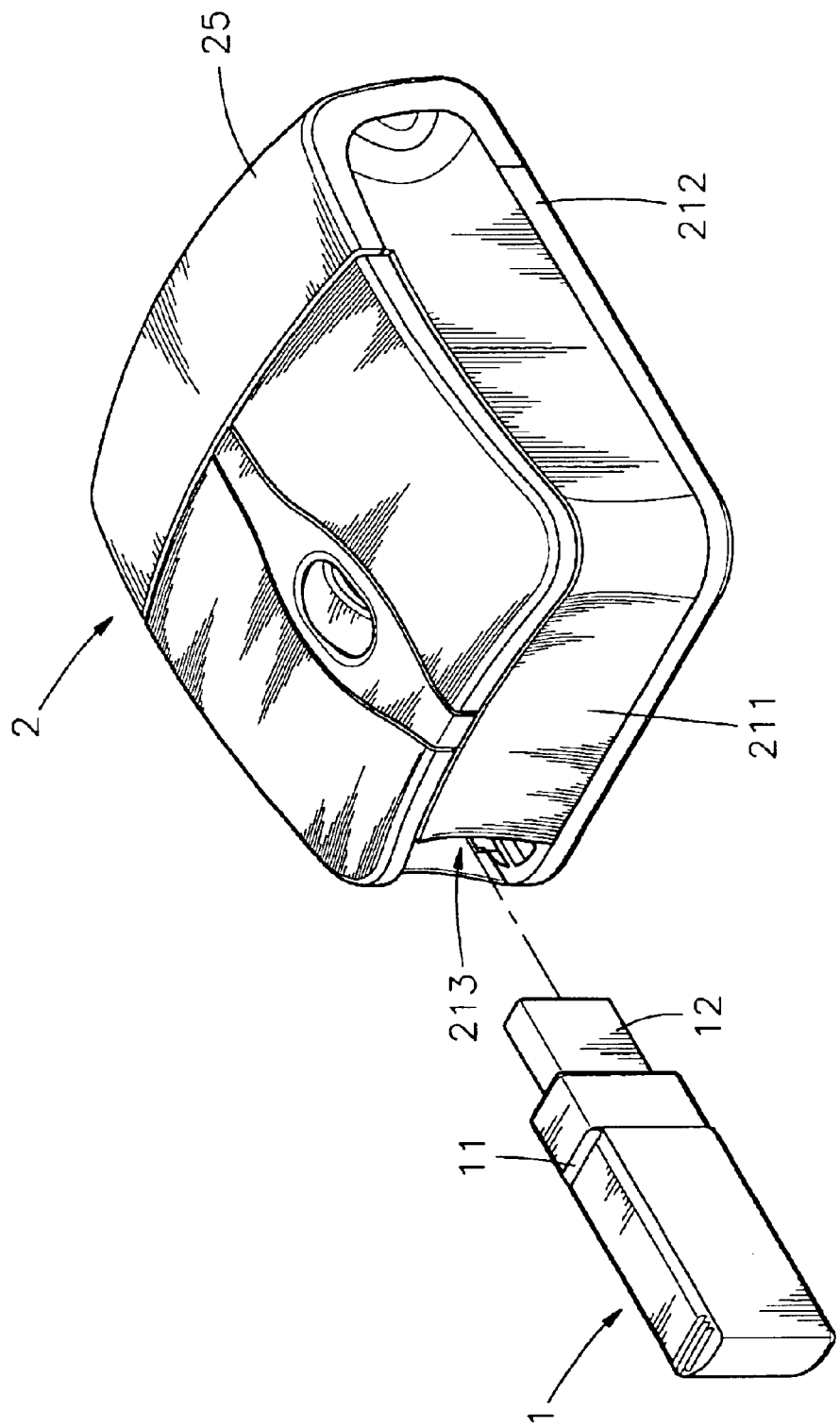
FIG. 3 is a schematic drawing showing the receiver unit taken away from the transmitter unit according to the present invention.
Figure 7:
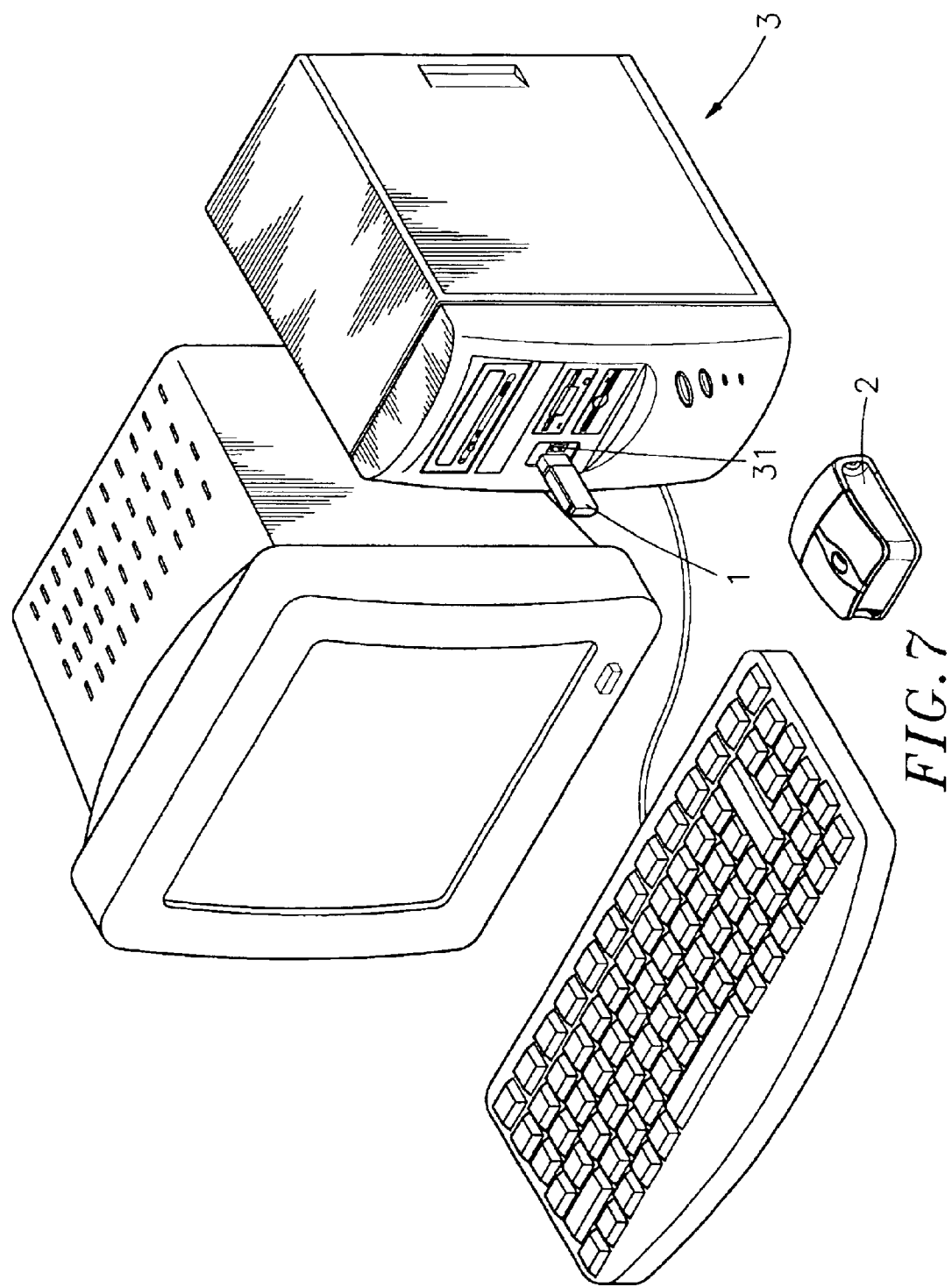
FIG. 7 is an applied view of the present invention, showing the receiver unit installed in a connection port of a computer system.
Figure 8:
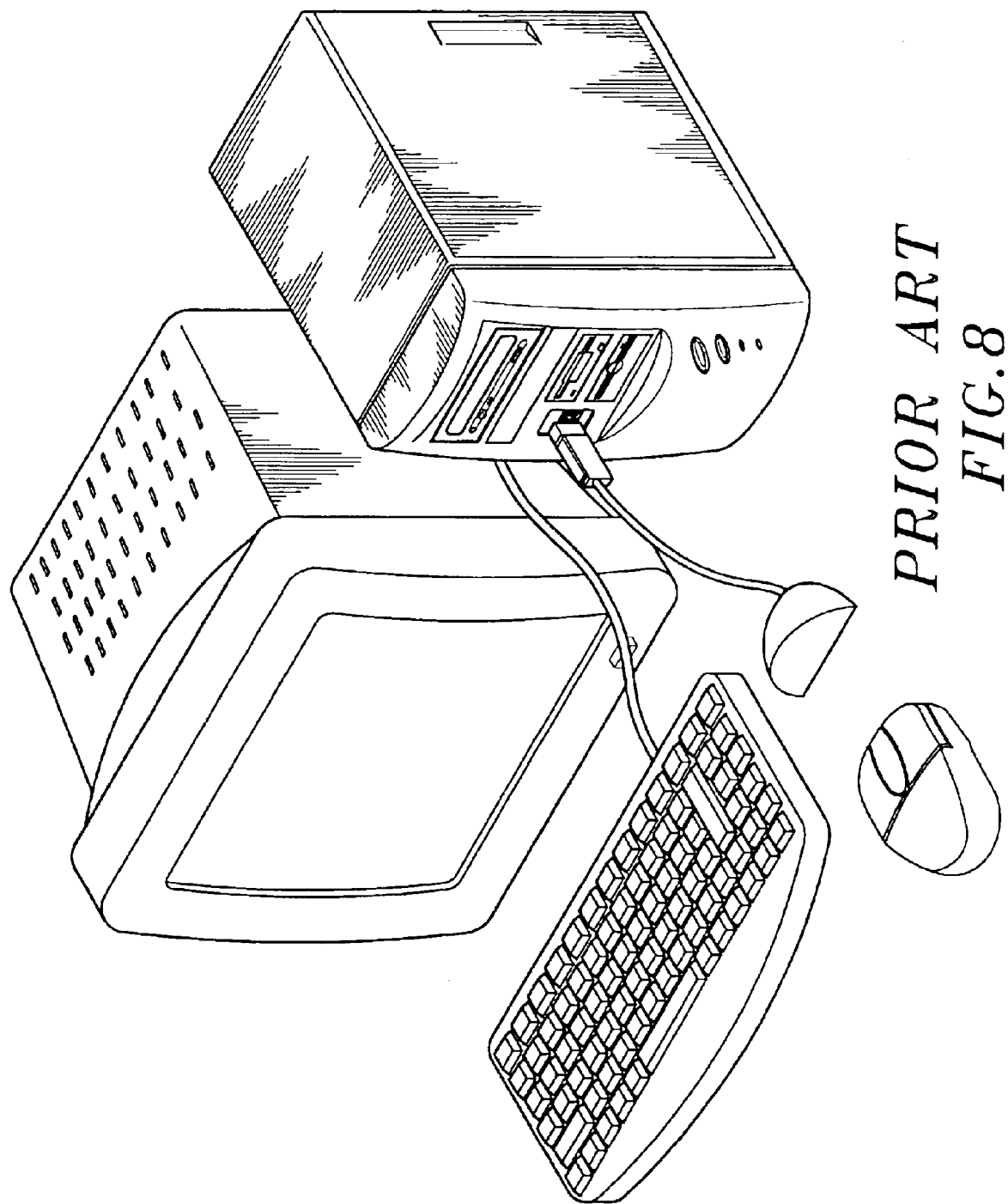
FIG. 8 illustrates the use of a wireless input device with a computer system according to the prior art.

Referring to FIGS. 1, 2, and 3, a wireless input device in accordance with the present invention is shown comprised of a receiver unit 1, and a transmitter unit 2. The receiver unit 1 is adapted for installing in a connection port 31 in a computer 3 to receive signal from the transmitter unit 2. The transmitter unit 2 can be a computer mouse, keyboard, joystick, or the like adapted to transmit signal to the receiver unit 1 for controlling the pointer on the computer screen of the computer 3 (see also FIG. 7).

The receiver unit 1 comprises two locating grooves 11 transversely symmetrically disposed in top and bottom sidewalls thereof, and a plug portion 12 forwardly extended from the front side thereof.

Figure 4:
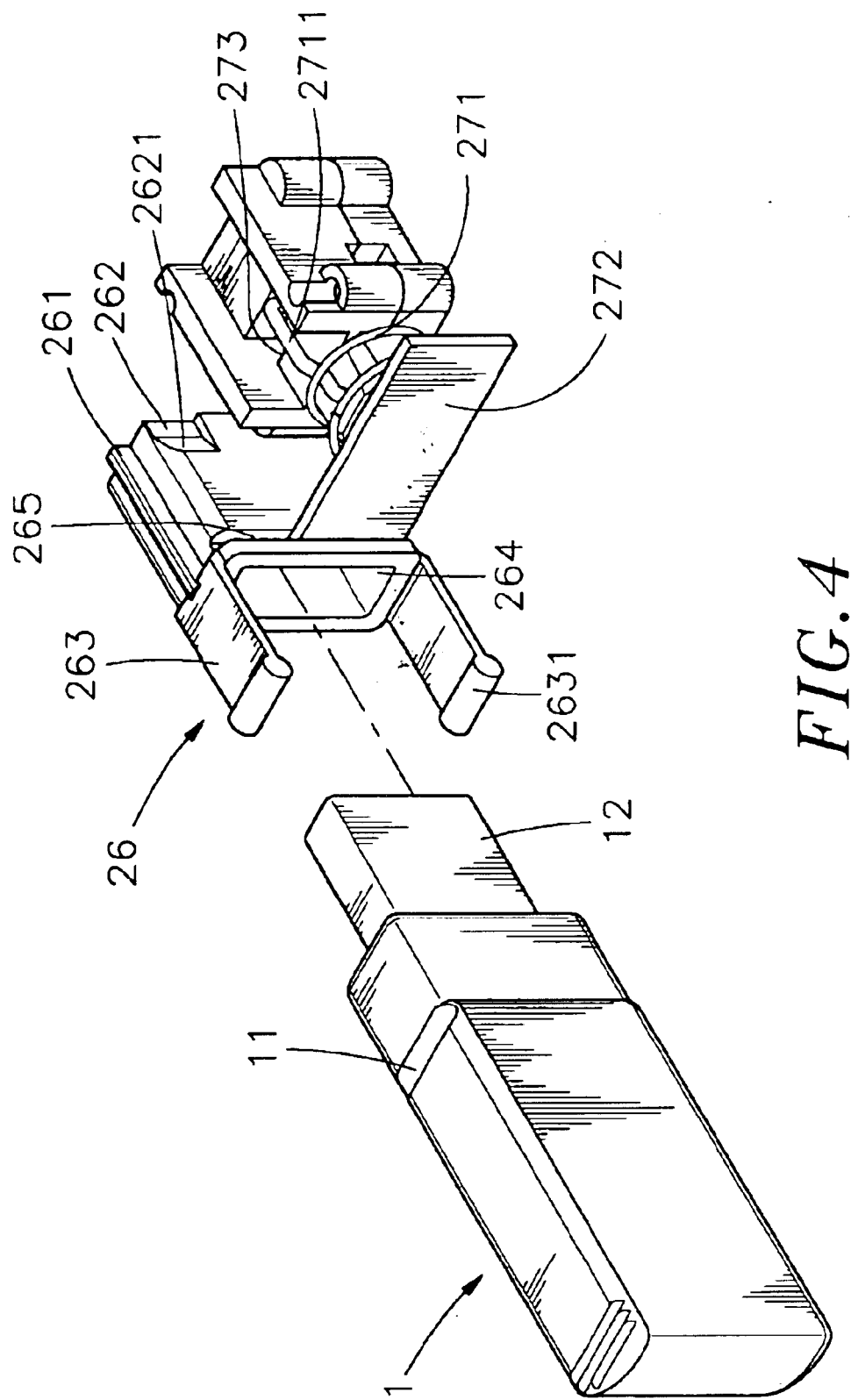
FIG. 4 is a schematic drawing showing the relationship between the sliding receptacle and the transmitter unit according to the present invention and the connection between the sliding receptacle and the ejector.
Figure 4A:
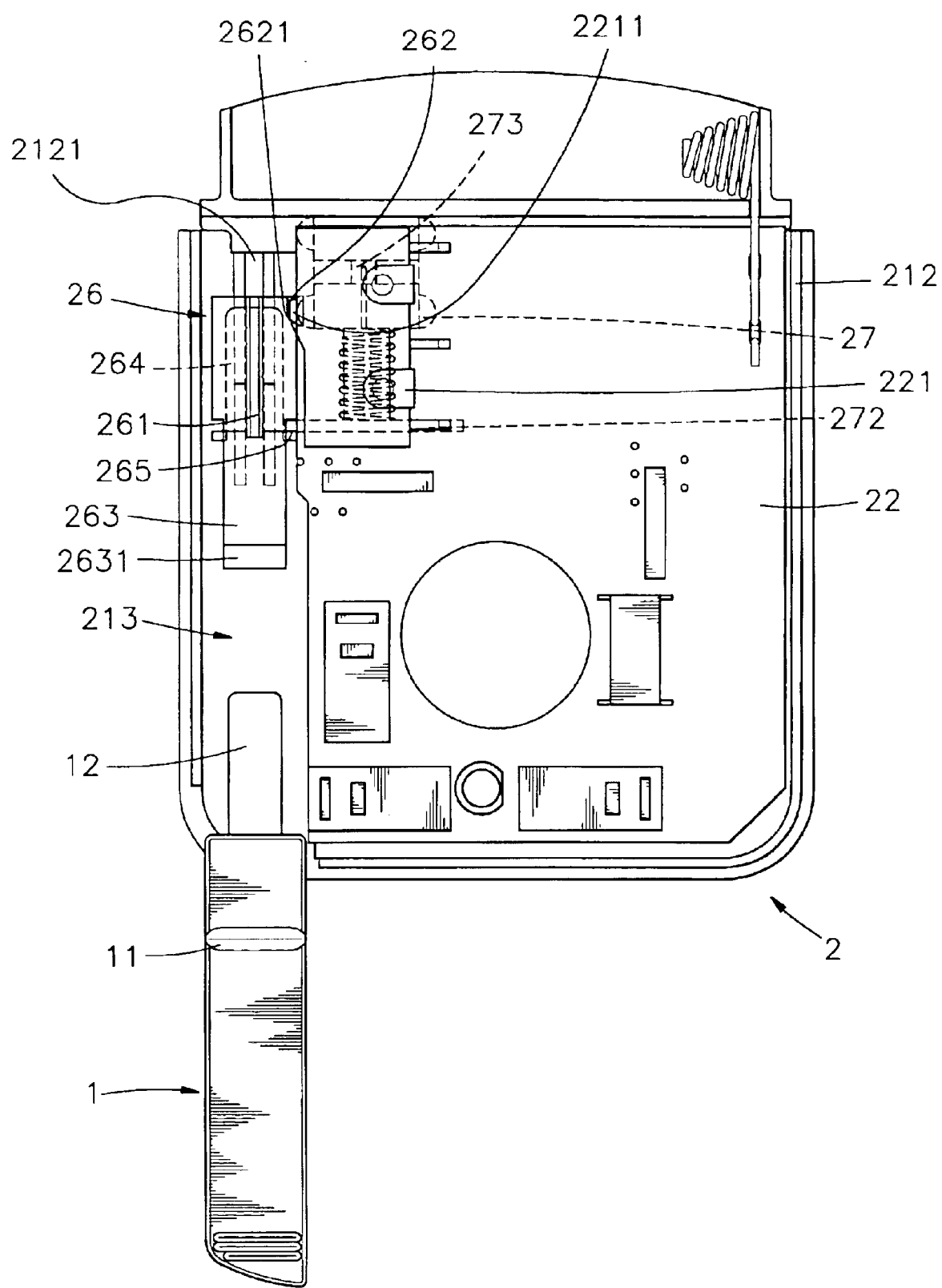
FIG. 4A is a top view of the present invention showing the receiver partially inserted into the receiving open chamber of the housing of the transmitter unit.
Figure 5:
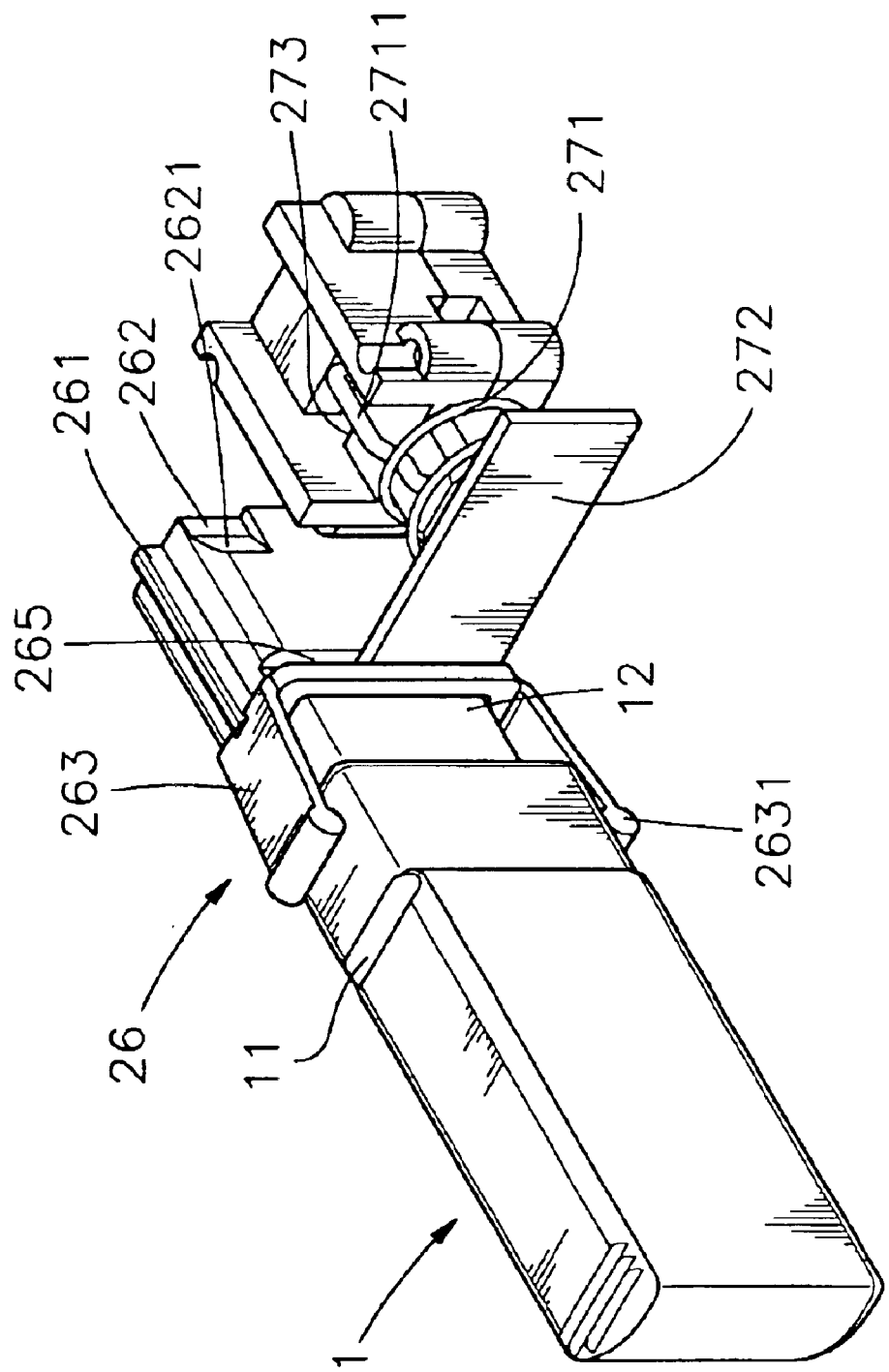
FIG. 5 is corresponding to FIG. 4, showing the transmitter unit inserted into the sliding receptacle.
Figure 5A:
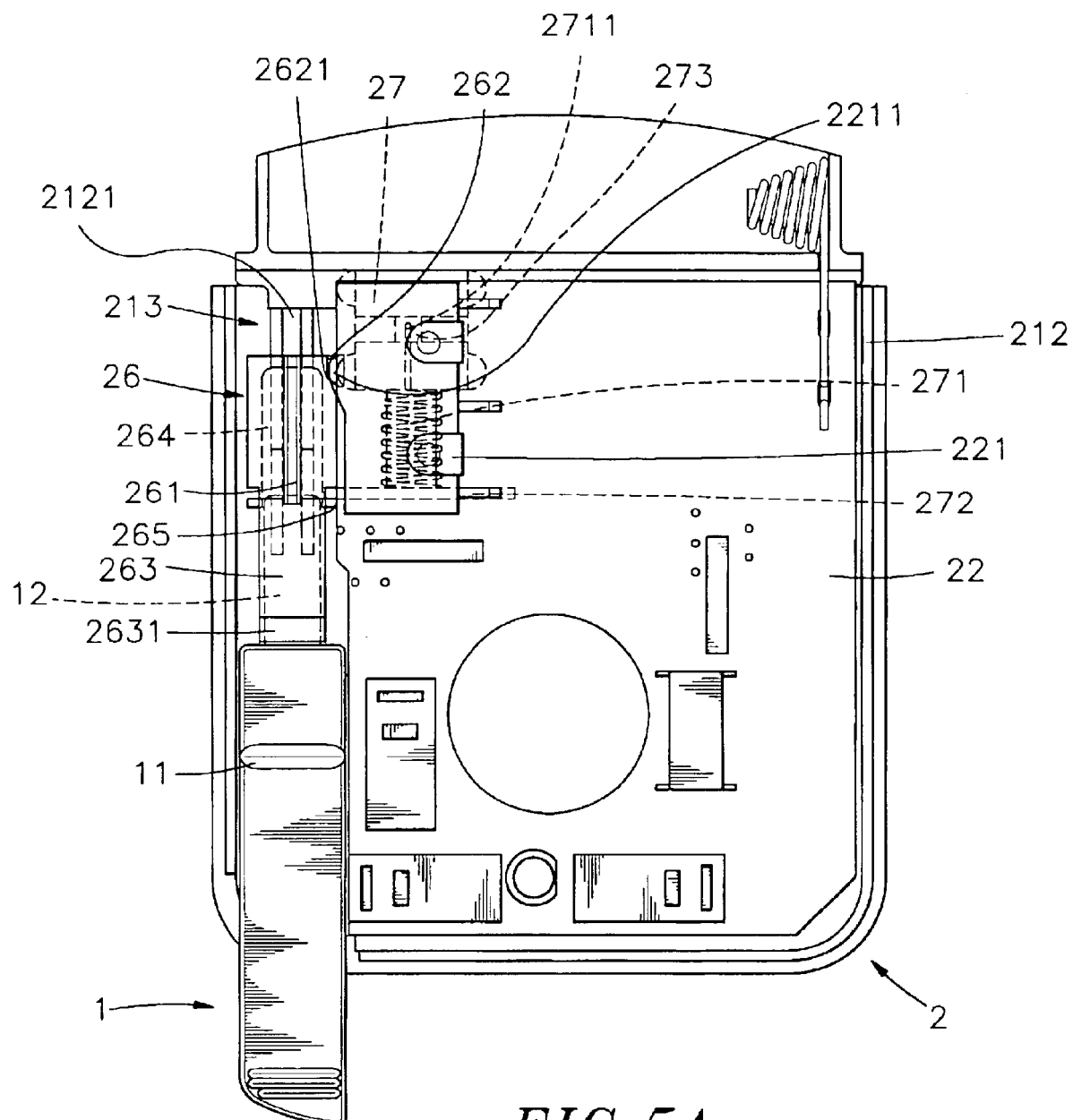
FIG. 5A is corresponding to FIG. 4A, showing the plug portion of the receiver unit inserted into the receiving open chamber of the sliding receptacle.
Figure 6:
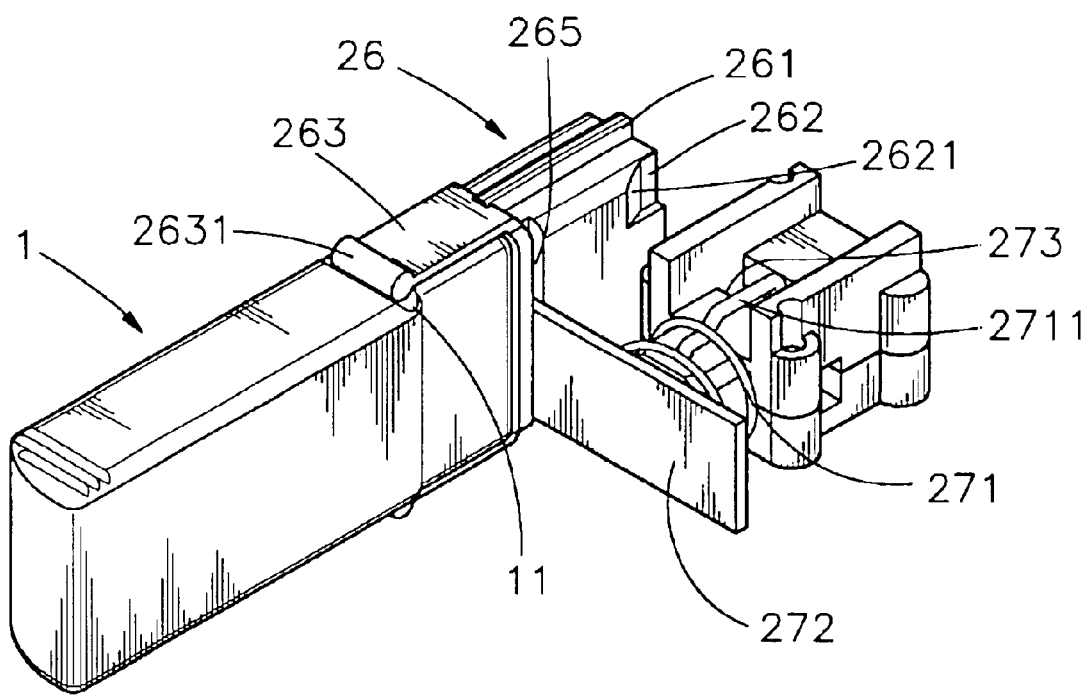
FIG. 6 is corresponding to FIG. 5, showing the retaining portions of the retaining arms of the sliding receptacle engaged into the locating grooves of the receiver unit respectively.
Figure 6A:
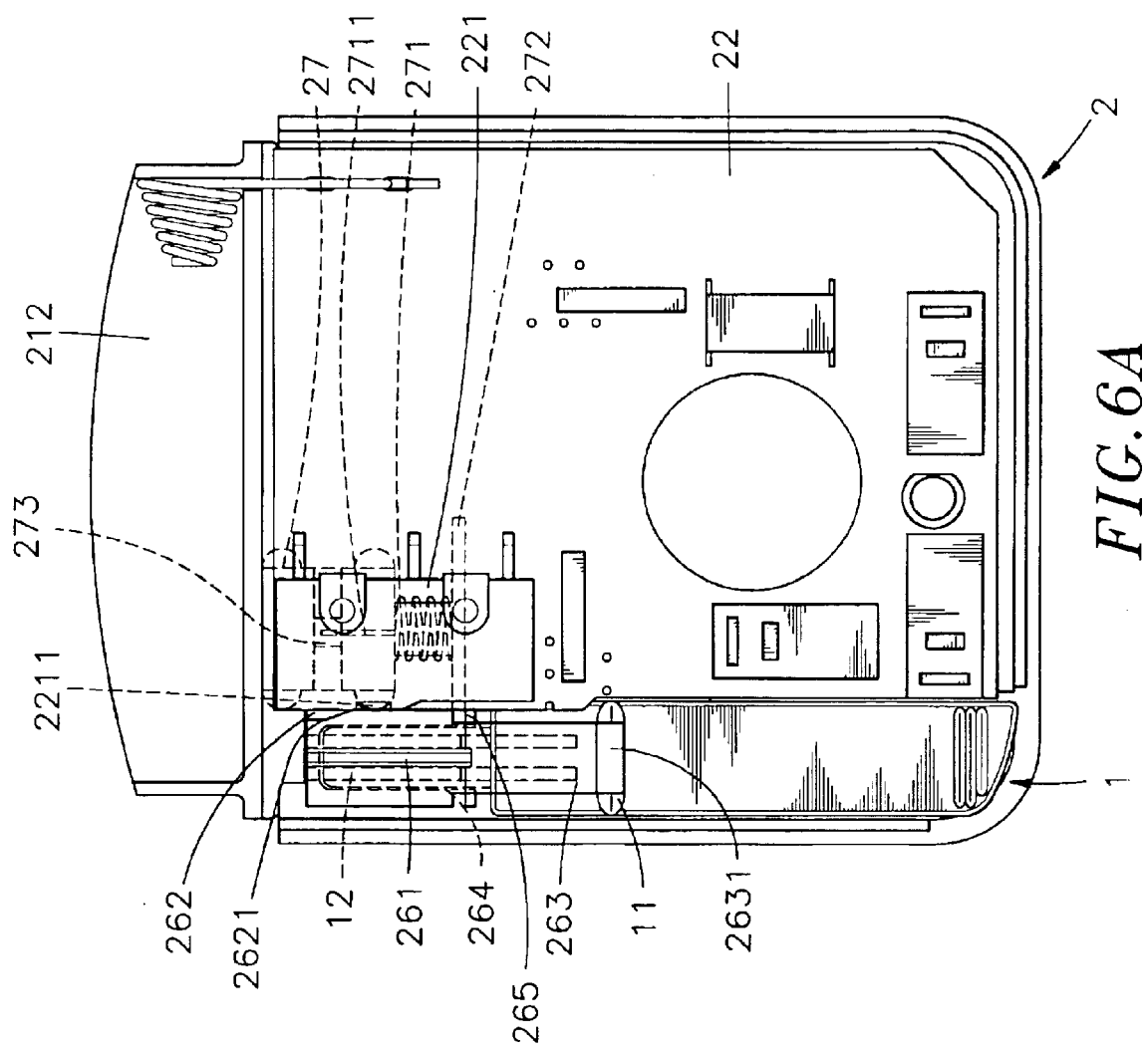
FIG. 6A is corresponding to FIG. 5A, showing the retaining portions of the retaining arms of the sliding receptacle engaged into the locating grooves of the receiver unit.

The transmitter unit 2 comprises a housing 21 formed of a top cover shell 211 and a bottom cover shell 212, and a battery cap 25 covered on the rear side of the housing 21. The housing 21 holds on the inside a circuit board 22, a sensor unit 23, a set of battery cells 24, and an ejector 27. The ejector 27 comprises a spring member 271, and a push board 272 supported on the spring member 271. The spring member 271 imparts a forward pressure to the push board 272. The top cover shell 211 comprises a receiving open chamber 213 disposed in the front side thereof, and a sliding receptacle 26 provided inside the receiving open chamber 213. The sliding receptacle 26 comprises two sliding rails 261 respectively longitudinally disposed in the top and bottom sides thereof and respectively slidably coupled to respective longitudinal sliding grooves 2121 in the top cover shell 211 and bottom cover shell 212 of the housing 21. The circuit board 22 comprises a power switch 221, and a control button 2211 adapted for switching on/off the power switch 221 (see also FIG. 4A).

Referring to FIGS. 4, 4A, 5, 5A, 6, 6A, and 7, the sliding receptacle 26 further comprises a guide groove 262 in one sidewall thereof near the rear end, a forwardly extended receiving open chamber 264 adapted for receiving the receiver unit 1, two retaining arms 263 forcedly extended from the top and bottom sides of the receiving open chamber 264 and adapted for securing the receiver unit 1 in the receiving open chamber 264, the retaining arm 263 each having a free end terminating in a transversely extended retaining portion 2631 adapted for engaging the locating grooves 11 of the receiver unit 1, and a side locating groove 265, which receives one end of the push board 272 of the ejector 27. When the wireless input device not in use, the receiver unit 1 is removed from the host computer 3 and inserted into the receiving open chamber 213 of the transmitter unit 2. When inserting the plug portion 12 of the receiver unit 1 into the receiving open chamber 264 of the sliding receptacle 26 and continuously pushing the receiver unit 1 forwards, the sliding receptacle 26 is forced backwards along the longitudinal sliding grooves 2121 in the housing 21 of the transmitter unit 2 to force the beveled guide face 2621 of the guide groove 262 against the control button 2211 of the power switch 221, thereby causing the power switch 221 to be switched off, and at the same time the push board 272 is moved backwards with the sliding receptacle 26 to force the spring member 271 backwards, causing the rear hooked portion 271 of the spring member 271 to hook in a retaining notch 273. When the power switch 221 switched off, the control button 2211 is stopped at one lateral sidewall of the sliding receptacle 26 to stop the sliding receptacle 26 in position, and at the same time the locating grooves 11 are respectively forced into engagement with the retaining portions 2631 of the retaining arms 263 of the sliding receptacle 26, thereby causing the receiver unit 1 to be secured to the sliding receptacle 26 in position.

When wishing to use the wireless input device, press the receiver unit 1 inwards to move the sliding receptacle 26 backwards. At this time, the push board 272 is moved backwards with the sliding receptacle 26 against the spring member 271 again, causing the spring member 271 to disengage the hooked portion 2711 from the retaining notch 273. When the hooked portion 2711 is disengaged from the retaining notch 273, the spring member 271 immediately forces the push board 272 and the sliding receptacle 26 forwards in a rush, thereby causing the sliding receptacle 26 to be disengaged from the control button 2211 of the power switch 221 and therefore the power switch 221 is returned to the normal closed position, i.e., the power switch 221 is automatically switched on again. At this time, the user can pull the receiver unit 1 outwards from the sliding receptacle 26 to disengage the locating grooves 11 from the constraint of the retaining portions 2631 of the retaining arms 263, and then insert the receiver unit 1 into the connection portion 31 of the computer 3 for receiving a signal from eh transmitter unit 2 at a distance.

A prototype of wireless input device has been constructed with the features of the annexed drawings of FIGS. 1~7. The wireless input device functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A wireless input device comprising a transmitter unit, and a receiver unit adapted for installing in a connecting port of a computer system and receiving from said transmitter unit to control a pointer on the computer screen of the computer system, said transmitter unit comprising a housing formed of a top cover shell and a bottom cover shell, a circuit board mounted inside said housing, a sensor unit electrically connected to said circuit board, and a battery power source installed in said housing and electrically connected to said circuit board, wherein said transmitter unit comprises a receiving open chamber in one side of said housing, and a receptacle provided inside said receiving open chamber and adapted for keeping said receiver unit after removal of said receiver unit from the computer system said receiving open chamber comprising a circuit board having a power switch, and wherein in response to positioning of the receiver unit in the receiving open chamber of the transmitter unit, power supply from said battery power source to said wireless input device is cut off.

2. The wireless input device as claimed in claim 1, wherein said sliding receptacle comprises a guide groove disposed in one side thereof corresponding to said power switch of said transmitter unit and adapted for acting against said power switch to switch off said power switch when said receiver unit is inserted into said receptacle and said receptacle is slid into the receiving open chamber of the transmitter unit, and for letting said power switch be automatically switched on when said receiver unit is removed from said receptacle.

3. The wireless input device as claimed in claim 1, wherein said housing comprises two longitudinal sliding grooves respectively disposed in top and bottom sides of the receiving open chamber thereof; said receptacle comprises two longitudinal sliding rails disposed at top and bottom sides thereof and respectively coupled to said longitudinal sliding grooves of said housing.

4. The wireless input device as claimed in claim 3, wherein said bottom cover shell comprises an ejector provided inside the receiving open chamber of said housing and adapted for pushing said receptacle toward a front side of the receiving open chamber of said housing, said ejector comprising a spring member, and a push board connected to one side of said receptacle and supported on said spring member.

5. The wireless input device as claimed in claim 4, wherein said receptacle comprises a locating groove disposed in one lateral sidewall thereof for the positioning of the push board of said ejector.

6. The wireless input device as claimed in claim 1, wherein said receptacle comprises at least one forwardly extended retaining arm adapted for securing said receiver unit in position after insertion of said receiver unit into said receptacle, said at least one retaining arm having a free end terminating in a retaining portion; said transmitter unit comprises at least one locating groove adapted for receiving the retaining portion of each of said at least one retaining arm of said receptacle respectively.

7. The wireless input device as claimed in claim 1, wherein said transmitter unit is a mouse.

8. The wireless input device as claimed in claim 1, wherein said transmitter unit is a keyboard.

9. The wireless input device as claimed in claim 1, wherein said transmitter unit is a joystick.

* * * * *

(12) EX PARTE REEXAMINATION CERTIFICATE (5697th)
United States Patent
Wang

(10) Number: US 6,909,421 C1
(45) Certificate Issued: *Mar. 6, 2007

(54) WIRELESS INPUT DEVICE

(75) Inventor: Yung-Hui Wang, Taipei (TW)

(73) Assignee: Paten Wireless Technology Inc., Taipei (TW)

( * ) Notice: This patent issued on a continued prosecution application filed under 37 CFR 1.53(d), and is subject to the twenty year patent term provisions of 35 U.S.C. 154(a)(2).

Reexamination Request:
No. 90/007,696, Aug. 29, 2005

Reexamination Certificate for:
Patent No.: 6,909,421
Issued: Jun. 21, 2005
Appl. No.: 10/162,922
Filed: Jun. 6, 2002

(30) Foreign Application Priority Data

Mar. 21, 2002 (TW) .................................... 91203462 U

(51) Int. Cl.
*G06F 3/033* (2006.01)

(52) U.S. Cl. .................... 345/163; 345/158; 345/169
(58) Field of Classification Search ..................... None
See application file for complete search history.

(56) References Cited

FOREIGN PATENT DOCUMENTS

| JP | 2000-267806 | 9/2000 |
|----|-------------|--------|
| TW | 291986 | 11/1996 |
| TW | 416036 | 12/2000 |
| TW | 440010 | 6/2001 |

*Primary Examiner*—David E. Harvey

(57) ABSTRACT

A wireless input device is constructed to include a transmitter unit, and a receiver unit adapted for installing in a connecting port of a computer system and receiving signal from the transmitter unit to control the pointer on the computer screen of the computer system, the transmitter unit having a receiving open chamber in one side of the housing thereof, and a receptacle provided inside the receiving open chamber and adapted for keeping the receiver unit for enabling the receiver unit to switch off the transmitter unit after removal of the receiver unit from the computer system.

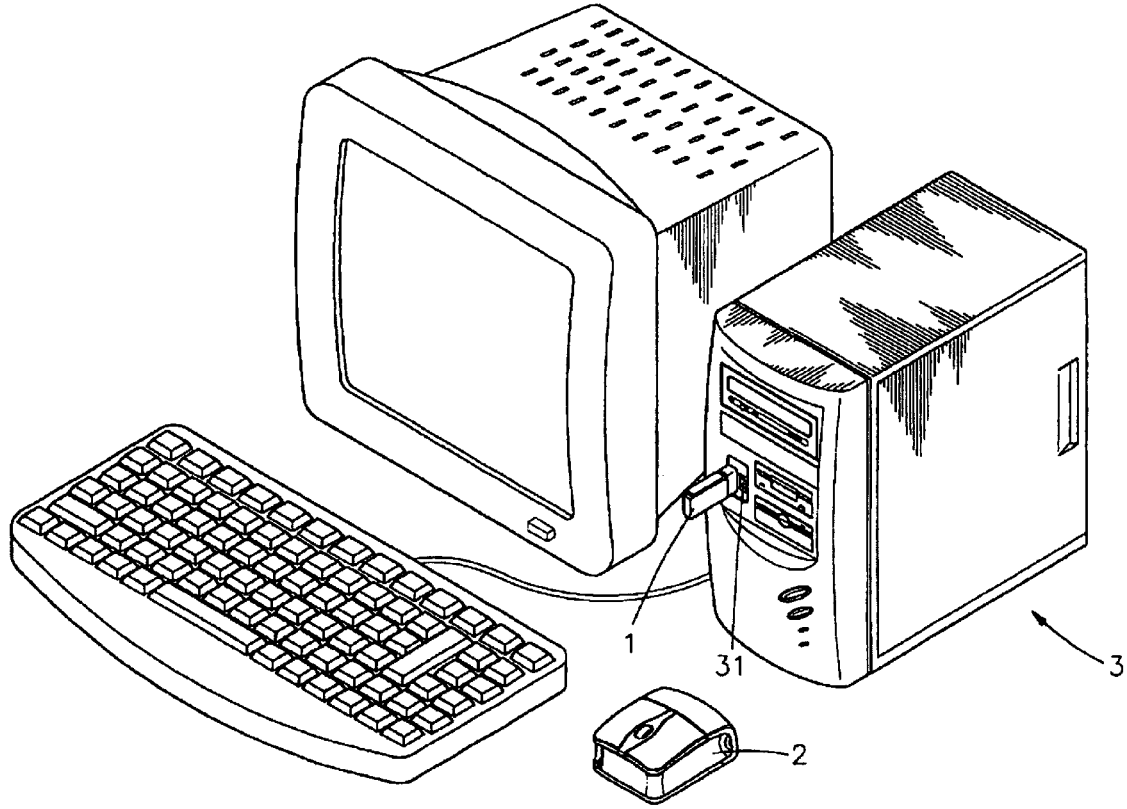

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–9 is confirmed.

* * * * *